T. H. BISHOP.
COPYHOLDER.
APPLICATION FILED OCT. 16, 1920.
1,428,938.
Patented Sept. 12, 1922.
2 SHEETS—SHEET 1.
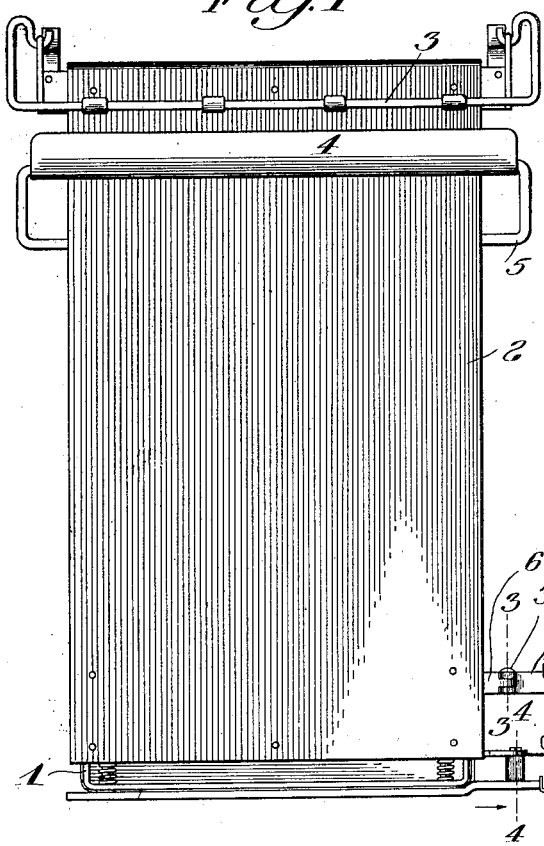
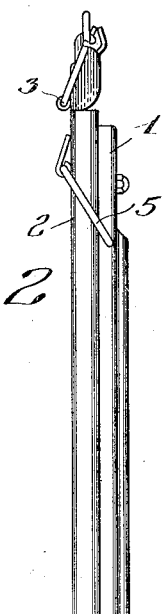
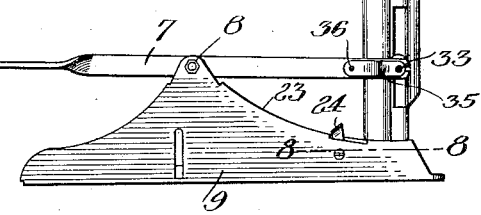
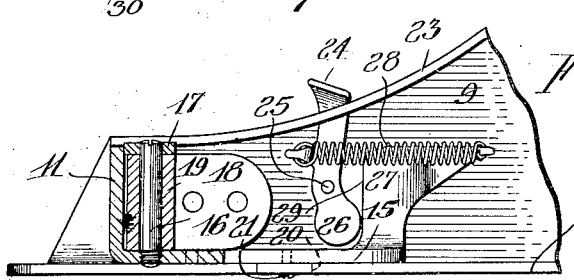
INVENTOR.
Thomas H. Bishop
BY
his ATTORNEY

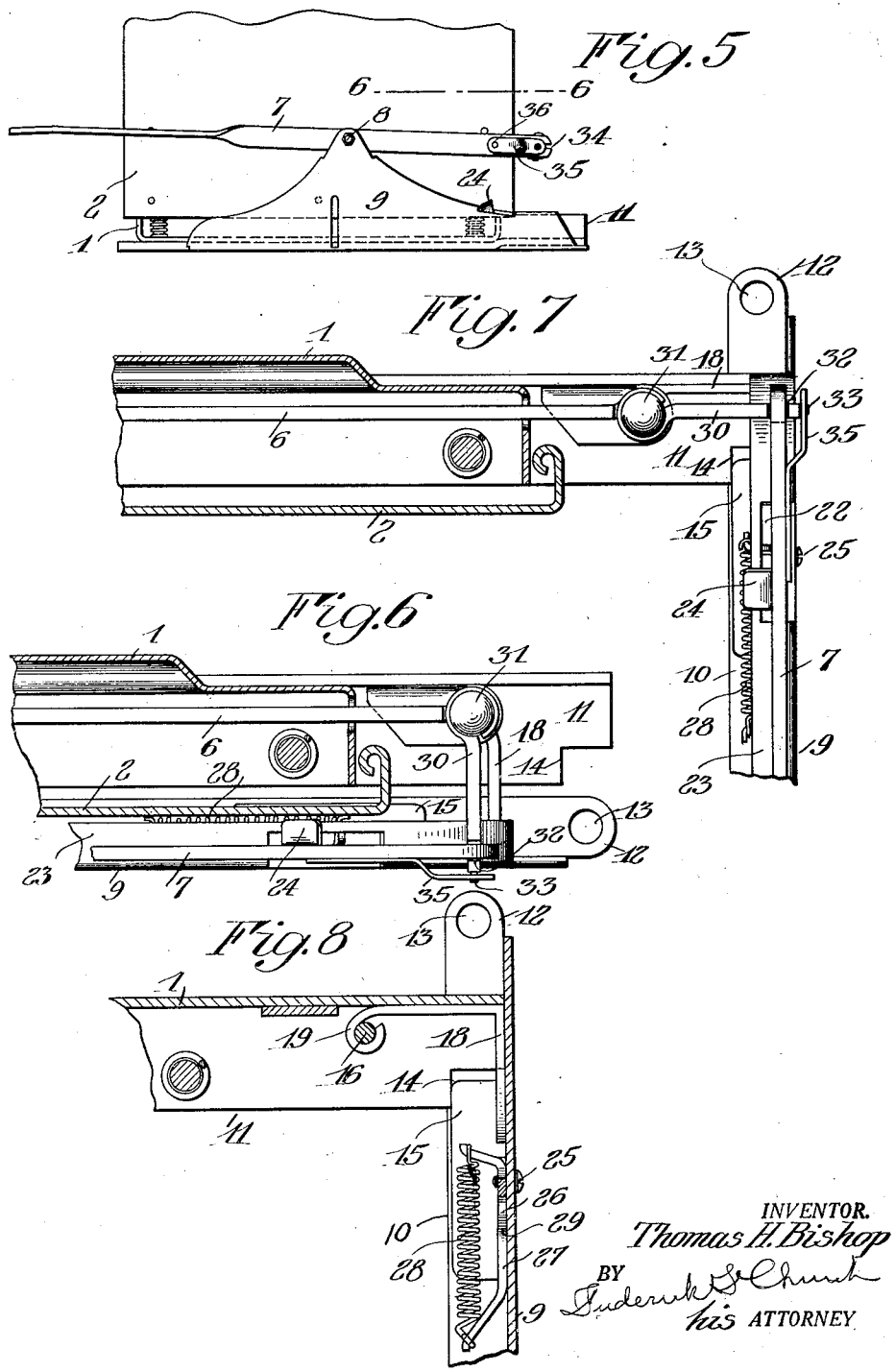

Patented Sept. 12, 1922.

1,428,938

UNITED STATES PATENT OFFICE.

THOMAS H. BISHOP, OF ROCHESTER, NEW YORK, ASSIGNOR TO THE LINE-A-TIME CO., INC., OF ROCHESTER, NEW YORK, A CORPORATION OF NEW YORK.

COPYHOLDER.

Application filed October 16, 1920. Serial No. 417,375.

*To all whom it may concern:*

Be it known that I, THOMAS H. BISHOP, of Rochester, in the county of Monroe and State of New York, have invented certain new and useful Improvements in Copyholders; and I do hereby declare the following to be a full, clear, and exact description of the same, reference being had to the accompanying drawings, forming a part of this specification, and to the reference numerals marked thereon.

My present invention relates to copyholders and is applicable to the type used by copyists in association with a typewriter, the copyholder embodying an upright frame with a copy plate movable thereon, the frame being supported and the copy plate operated by a side arm and lever arranged at the side of the machine and the invention has for its object to provide a simple, convenient and efficient copyholder of this character in which the side arm and operating lever are foldable across the frame and copy plate when the copyholder is not in use or is to be packed for shipment. The improvements are directed toward the adaptation of the connection of the operating lever on the side arm and the plate actuating lever on the frame to this folding movement without requiring that these parts be disconnected. To these and other ends the invention resides in certain improvements and combinations of parts all as will be hereinafter more fully described, the novel features being pointed out in the claims at the end of the specification.

In the drawings:

Figure 1 is a front view of a copyholder constructed in accordance with and illustrating one embodiment of my invention;

Figure 2 is a side view thereof;

Figure 3 is an enlarged fragmentary section on the line 3—3 of Figure 1;

Figure 4 is an enlarged fragmentary section on the line 4—4 of Figure 1, looking in the direction of the arrow;

Figure 5 is a fragmentary front view showing the folded position of the side arm;

Figure 6 is an enlarged fragmentary horizontal section on the line 6—6 of Figure 5;

Figure 7 is a similar view but showing the side arm extended, and

Figure 8 is an enlarged fragmentary section on the line 8—8 of Figure 2.

Similar reference numerals throughout the several views indicate the same parts.

To first describe generally the nature of the copyholder shown, which is of a familiar type, 1 indicates an upright frame upon which is mounted a vertically movable copy plate 2 having a clip 3 at the top to secure the copy and spanned by a transverse line indicator 4 carried on the frame at 5 so that the copy is moved past the line indicator. The copy plate is raised step-by-step by the vibration of a transverse actuating lever 6 through mechanism that it is not necessary to show herein, means being provided for dropping the copy plate from its elevated position. The actuating lever 6 is vibrated by depressing an operating lever 7 extending forwardly toward the operator and pivoted at 8 to a pressed steel side arm 9 extending at right angles to the plane of the frame 1 and in a forward direction along the side of the typewriter.

The side arm 9 is of a flanged or L-shaped construction and the bottom flange 10 thereof is extended beyond and crosses beneath a lateral extension 11 of the frame 1, as shown at 12, this portion 12 being preferably perforated at 13 to receive a securing device, if desired. A shoulder 14 on the extension 11 cooperates with a raised plate 15 on the flange 10 of the side arm, as shown in Figures 7 and 8. Rising from the extension 11 of the frame 1 at a point removed from its end is a pivot pin 16 shown in Figure 8 and also in Figure 4, the extension 11 being also L-shaped as shown in the latter figure and flanged at 17 to receive the top of the pivot. Secured to the side arm 9 is a bracket 18 terminating in a laterally offset kunckle 19 that turns on the pivot 16. The plate 15 is a locking plate to make rigid the connection between the side arm 9 and the extension 11 of the frame 1, as shown in Figure 7 and is slidable upon the side arm in a manner hereinafter described. When it is released, the side arm may be swung to the folded position of Figures 5 and 6 on the pivot pin 16 and in so doing, it will be noted that the extension 12 of the side arm is swung inwardly so that it does not project beyond the extension 11 of the frame 1 and increase the overall width of the folded machine, this, of course, being due to the offsetting of the pivot 16.

The locking plate 15 is guided in a slot 20 in the flange 10 of the side arm shown in dotted lines in Figure 4, the plate being provided on its under side with a headed pin 21 cooperating with this slot. Projecting through a slot 22 in the upper flange 23 of the side arm 9 is a releasing lever 24 pivoted at 25 (Figure 4) and terminating at its lower end in a cam portion 26. An upward extension 27 of the plate 15 is connected by a spring 28 to lever 24 which holds the plate 15 in operative engagement with the shoulder 14 of the frame 1 as shown in Figure 8, movement of the lever 24 being limited by the end of the slot 22. When it is desired to release the plate 15, the lever 24 is thrust rearwardly or to the left in Figure 4 which causes the cam portion 26 to ride a surface 29 on the portion 27 of the plate and retract it against the tension of the spring.

The actuating lever 6 is a two-part lever, the end portion 30 thereof being hinged to the body portion 6 by a vertical pivot 31 and this pivotal axis is in vertical alinement with the axis of the hinge connection 16 between the main frame 1 and the side arm 9. Therefore, the folding movement of the frame pieces heretofore described is permitted by the folding of the actuating lever 5 on the same center, as shown in Figure 6, without disturbing the connection between the actuating lever and its operating lever 7.

For connection with the operating lever the part 30 of the actuating lever is provided near its ends with a reduced pivot portion 32 and at its extremity is provided with a small centering projection 33. The operating lever 7 has a slotted bearing 34 formed in its rear end which bearing may be inserted onto the pivot portion 32 of the actuating lever in a direction edgewise of the latter and locked with it when the operating lever 7 is rotated into another plane in a manner well understood by mechanics. To prevent lost motion and rattling in this bearing connection, I provide a leaf spring 35 on the operating lever 7 pivoted thereto at 36 and having an aperture or recess engaging over the centering projection 33 which places the two levers under relative tension and holds a tight bearing at the point of their pivotal connection.

I claim as my invention:

1. In a copyholder, the combination with a frame, a copy plate movable thereon, and a side arm for supporting the frame hinged thereto on a vertical axis to fold across the same, of a two part transverse lever carried by the frame to actuate the copy plate, the parts of the lever being pivoted together on a vertical axis coincident with the hinge axis of the frame and side arm, and an operating lever pivoted to the side arm and operatively connected to the actuating lever.

2. In a copyholder, the combination with a frame having a lateral extension at its bottom and a vertical pivot on the extension removed from the end thereof and set back from said end toward the frame, a copy plate movable on the frame, and a transverse lever carried by the latter to actuate the copy plate, of a side arm for supporting the frame disposed across the end of the extension on the frame and itself provided with a relatively lateral extension offset therefrom toward the frame and turning on the pivot of the frame extension to permit the side arm to fold across the frame, and an operating lever pivoted to the side arm and operatively connected to the actuating lever.

3. In a copyholder, the combination with a frame having a lateral extension at its bottom and a vertical pivot on the extension removed from the end thereof and a copy plate movable on the frame, of a two-part transverse lever carried by the frame to actuate the copy plate, the parts of the lever being pivoted together on a vertical axis coincident with the aforesaid pivot, a side arm for supporting the frame disposed across the end of the extension on the frame and itself provided with an offset extension turning on the pivot of the frame extension to permit the side arm to fold across the frame, and an operating lever pivoted to the side arm and operatively connected to the actuating lever.

4. In a copyholder, the combination with a frame, a copy plate movable thereon and a side arm supporting the frame, of a transverse lever on the frame for actuating the copy plate and having a reduced pivot portion near its end and a centering projection at its tip and an operating lever on the side arm having a slotted bearing portion at its end to receive the pivot portion of the actuating lever and also provided with a leaf spring cooperating with the centering projection to reduce lost motion in the pivot bearing.

5. In a copyholder, the combination with a frame, a copy plate movable thereon, and a side arm for supporting the frame hinged thereto to fold across the same, one of said members being arranged to overlap the other and being provided with a locking shoulder, of a locking plate slidable on the other member to engage or be disengaged from said shoulder.

6. In a copyholder, the combination with a frame, a copy plate movable thereon and a side arm for supporting the frame hinged thereto to fold across the same, one of said members being arranged to overlap the other and being provided with a locking shoulder, of a locking plate slidable on the other member to engage or be disengaged from said shoulder, a releasing lever provided with a cam for disengaging the locking plate and a spring connecting the plate and lever to maintain the former in locking position.

THOMAS H. BISHOP.

CERTIFICATE OF CORRECTION.

Patent No. 1,428,938.                                      Granted September 12, 1922, to

THOMAS H. BISHOP.

It is hereby certified that the assignee in the above numbered patent was erroneously described and specified as "The Line-A-Time Co., Inc." whereas said assignee should have been described and specified as "The Line-A-Time Mfg. Co., Inc.", as shown by the records of assignments in this office; and that the said Letters Patent should be read with this correction therein that the same may conform to the record of the case in the Patent Office.

Signed and sealed this 23rd day of October, A. D. 1928.

M. J. Moore,
(Seal)                                                  Acting Commissioner of Patents.